United States Patent
Hohensee et al.

(12)

(10) Patent No.: US 6,407,821 B1
(45) Date of Patent: Jun. 18, 2002

(54) METHOD AND APPARATUS FOR PRINTING DOCUMENTS INCLUDING EMBEDDED PRINT OBJECTS WITH AN INTELLIGENT PRINTING SYSTEM

(75) Inventors: Reinhard H. Hohensee, Boulder; David E. Stone; Dwight R. Palmer, both of Longmont, all of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/149,333

(22) Filed: Sep. 8, 1998

(51) Int. Cl.[7] .............................................. G06F 15/00
(52) U.S. Cl. ...................................... 358/1.15; 358/1.9
(58) Field of Search .............................. 358/1.15, 401, 358/1.9, 1.18, 1.14

(56) References Cited

U.S. PATENT DOCUMENTS

| | | |
|---|---|---|
| 5,768,488 A | 6/1998 | Stone et al. |
| 5,987,226 A * | 11/1999 | Ishikawa ..................... 395/112 |
| 6,115,132 A * | 9/2000 | Nakatsuma ................. 358/1.14 |
| 6,173,289 B1 * | 1/2001 | Sonderegger ................ 707/103 |
| 6,188,487 B1 * | 2/2001 | Matsubara .................. 358/1.15 |

* cited by examiner

*Primary Examiner*—Jerome Grant, II
(74) *Attorney, Agent, or Firm*—Kudirka & Jobse, LLP; Scott W. Reid (57) ABSTRACT

An intelligent printing system is extended to handle print objects such as EPS and PDF print objects without requiring the objects to be reformatted by selectively decomposing the EPS and PDF print objects and placing resource information contained in the objects in a resource database along with the print data. The resource information is not duplicated; only the first appearance of a resource is stored, later duplicates are discarded. Appropriate references are placed in the page description data stream so that the resource information can be retrieved and downloaded to the printer when the data is being processed at the print server. The downloading of a particular resource occurs only once. When the print data is sent to the printer, the downloaded resource information is recombined with the data and the combination is sent to a conventional EPS or PDF rasterizing program which converts the objects to printable data.

56 Claims, 8 Drawing Sheets

METHOD AND APPARATUS FOR PRINTING DOCUMENTS INCLUDING EMBEDDED PRINT OBJECTS WITH AN INTELLIGENT PRINTING SYSTEM

FIELD OF THE INVENTION

This invention relates generally to computer systems having printers and display devices and, more particularly, to printing final form print documents containing various print objects on a printer.

BACKGROUND OF THE INVENTION

Computer systems can generate output information in several ways, including video output and "hard copy" or printed output. Although more and more output consists of evanescent video screens, a large amount of data is still printed on paper and other permanent media. Therefore, there is a need for efficiently describing printed data and then printing a hard copy page from the print description. Since many modern printers are "intelligent" and capable of storing commands and data, the print description is preferably arranged to minimize the amount of information transferred to the printer over a data transfer path, such as a network.

There are several prior art systems which have been designed to accomplish the aforementioned objectives. Generally, the print data stream is encoded by means of a page description language which describes the format of each page. There are several conventional page description languages. One of these is called POSTSCRIPT® which is a print document description language which has been developed by the Adobe Corporation, San Jose, Calif. A POSTSCRIPT® encoded document includes a file containing page description commands or "operators." The POSTSCRIPT® operators describe how each page in the document is composed. A single POSTSCRIPT® file can generate a multi-page document because each page is composed according to the operators in the file. Therefore, POSTSCRIPT® produces a very compact encoded document structure.

One problem with documents described using POSTSCRIPT® is that it is not possible to examine a POSTSCRIPT® encoded document and ascertain where a particular page begins and ends without starting at the beginning of the document and calculating where each page break occurs. Therefore, documents encoded in the POSTSCRIPT® language are difficult to view on a display screen. Further, if an error occurs during printing, it may be difficult to restart the printer at any place except the beginning of the document.

In order to overcome some of the difficulties with POSTSCRIPT®, another page description language was developed by the Adobe Corporation called ENCAPSULATED POSTSCRIPT (EPS.) An EPS file is a self-contained version of a POSTSCRIPT® file that describes a single-page graphic. In particular, drawings or artwork are normally encapsulated in self-contained EPS objects that do not refer to any resources other than those that are part of the EPS object. Typically, an EPS object encodes a single page graphic image. Each EPS object contains a header portion called a "prolog" followed by normal POSTSCRIPT® operators. The prolog contains resource and formatting information and describes the POSTSCRIPT® data in the object.

A problem with EPS objects is that each object contains prolog information. If the same EPS object, or EPS objects created by the same application, are included on each page of a multi-page document to be printed, then the same prolog information is in each EPS object and will be downloaded to the printer for each page. The result is that a large amount of redundant data will be sent to the printer.

Another formatting language is called the Portable Document Format (PDF) language which was also developed by the Adobe Corporation. PDF is a file format which describes a group of pages to be viewed and uses graphic operators which are similar, but not equivalent, to POSTSCRIPT® operators. However, a PDF file actually refers to single pages that can be viewed and printed separately inside the file. A PDF file is constructed with a header, a trailer, a cross reference table and a body. Page objects containing information for each page are located inside the body, in random order, and resource objects containing resource information are also located inside the body. The trailer portion of the file contains a pointer to the cross reference table and the cross reference table indexes the various page and resource objects. Since the cross reference table is located in the trailer the file can be generated by a one pass operation. In addition, viewing the pages in any order is straightforward. Specifically, in order to view a page, the trailer in the PDF file is first located to obtain the pointer to the cross reference table. Once the cross reference table is located then the index to a particular page can be obtained.

While viewing a PDF file is straightforward, printing with this format is not optimum because the trailer must be located before printing of the file can start. Since the file trailer is at the end of the file, the entire file must be loaded before printing can start. If the file is large, a substantial amount of memory is required. In addition, each page may also contain resources files, such as fonts and bitmaps, which may be referred to in the file at various locations. Therefore, if the same resources are included on each page of a multi-page PDF document to be printed, then the same resource information will be downloaded to the printer for each PDF page. The result is similar to the EPS situation in that a large amount of redundant data will be sent to the printer.

Another page description language is known as MO:DCA™ (Mixed Object Document Content Architecture), described in detail in I.B.M. Mixed Object Document Content Architecture Reference number SC31-6802. This language has the characteristic that page information is stored in the order that it is printed so that file processing can begin as soon as the information for the first page is located. During file construction, common resources, such as fonts, are removed from the print data and stored in a separate resource database. A reference is placed in the file to refer to the stored resource.

The MO:DCA file format is designed to be used with a printing system known as the "Advanced Function Presentation" (AFP) printing system developed by, and available from, International Business Machines Corporation, Armonk, N.Y. This printing system has an intelligent print server which receives the print data and uses the references in the data stream to retrieve the stored resources from the resource database. The resources are then downloaded to the printer ahead of the data. At the printer the resources are combined with the print data and sent to a rasterizer for printing.

The MO:DCA file format has the advantage that pages can easily be located in the data stream because the page information is stored in the order that it will be printed. Also, each page contains an "Active Environment Group" definition that specifies the resources that are required to print the page. In addition, if an error occurs during printing, it is possible to restart the printing process from the last page printed rather than from the beginning of the file. However, the AFP system only provides these advantages with the "native" MO:DCA file format and "native" objects contained therein. It cannot provide the same level of recovery with other, "non-native", file formats such as EPS and PDF objects discussed above. In order to print these objects it is necessary to regenerate the objects in MO:DCA format.

Therefore, it,would be desirable to modify the AFP system to handle non-native print objects which are originally formatted in various different formats, such as EPS and PDF formats. It would also be desirable to manage the resources in such objects so that the redundant downloading of resources is avoided.

SUMMARY OF THE INVENTION

In accordance with the principles of the invention, the print system is extended to handle non-native print objects, such as EPS and PDF print objects, without requiring the non-native objects to be reformatted, by selectively decomposing the EPS and PDF print objects and placing resource information in the resource database while leaving the print data, or a reference to the print data, in the page description data stream. Appropriate references are placed in the page description data stream so that the resource information can be retrieved and downloaded to the printer when the print data is being processed at the print server. When the print data is sent to the printer, the downloaded resource information is recombined with the print data and the combination is sent to a conventional EPS or PDF rasterizing program which converts the objects to printable data.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF ILLUSTRATIVE EMBODIMENTS

Figure 1:
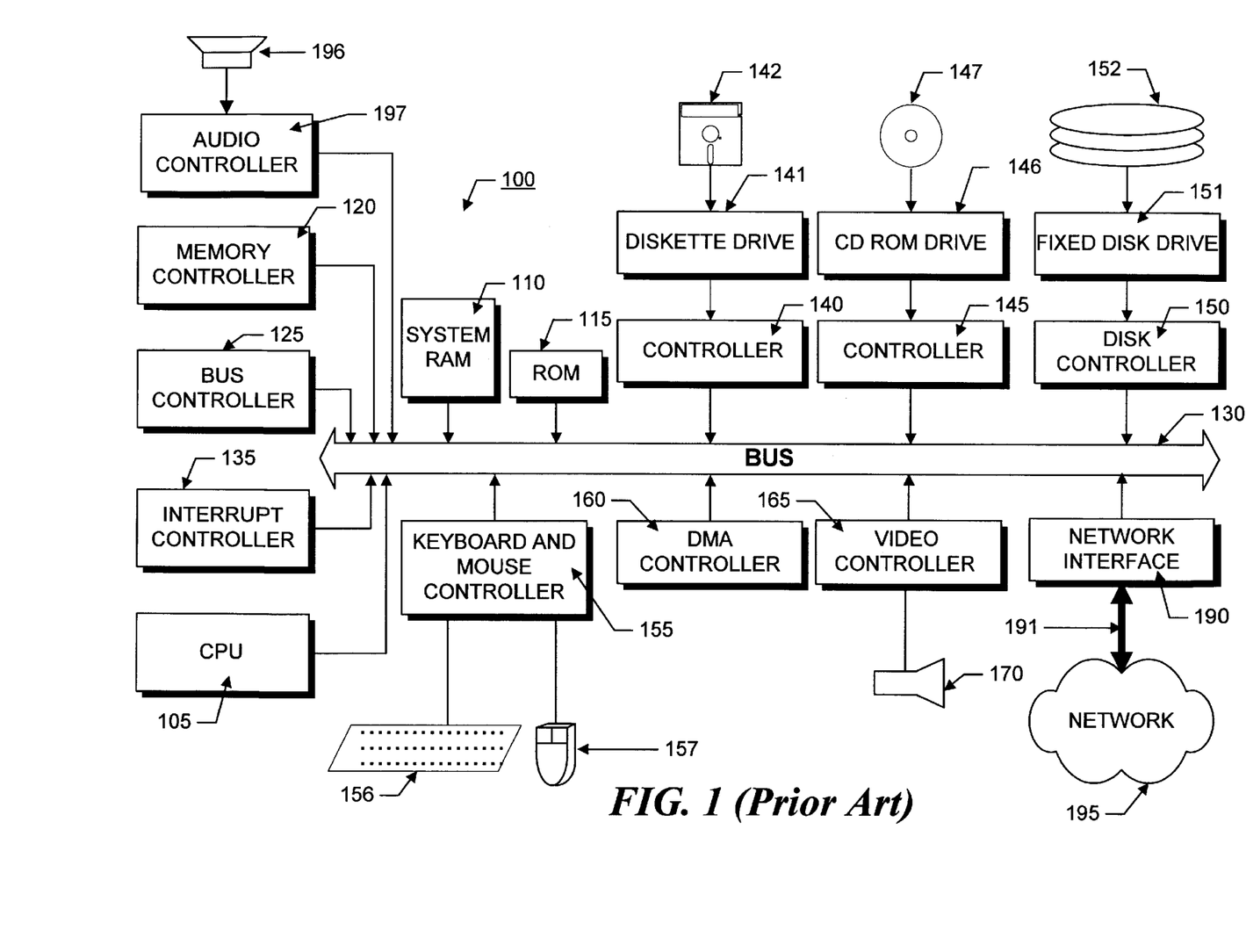
FIG. 1 illustrates the system architecture for a conventional exemplary computer system on which the preferred embodiment of the invention can be implemented.

FIG. 1 illustrates the system architecture for an exemplary client computer 100, such as an IBM THINKPAD 701® computer, on which the disclosed printing system can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general purpose communication lines that interconnect a plurality of network devices.

Client computer system 100 generally is controlled and coordinated by operating system software, such as the WINDOWS 95® operating system (available from Microsoft Corp., Redmond, Wash.) or WINDOWS NT® operating systems (available from Microsoft Corp., Redmond, Wash.) or the AIX® operating system (available from International Business Machines Corporation, Armonk, N.Y.) Among other computer system control functions, the operating system controls allocation of system resources and performs tasks such as process scheduling, memory management, networking and I/O services.

Figure 2:
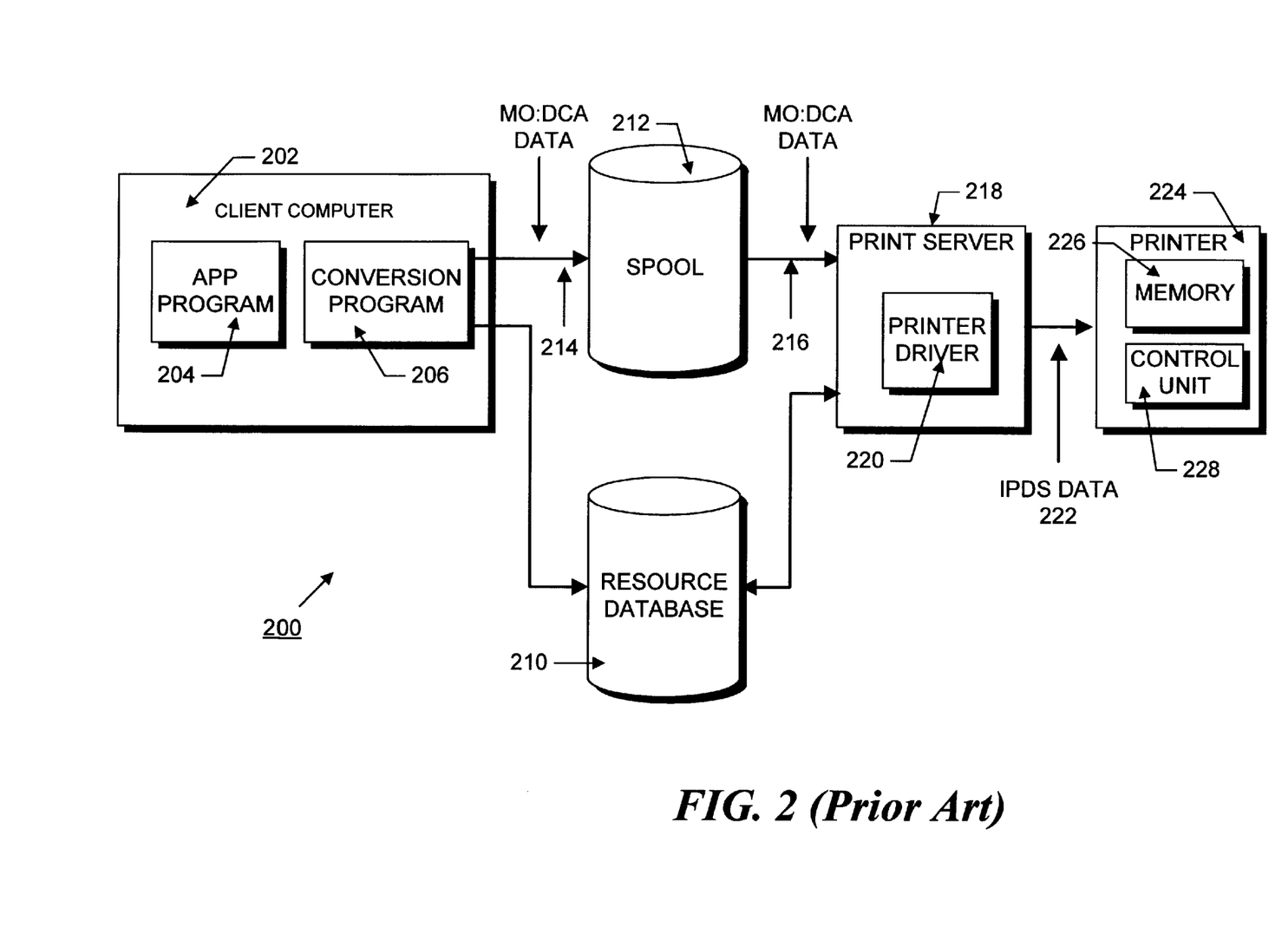
FIG. 2 is a schematic drawing of a prior art Advanced Function Presentation system for printing a document produced by an application program.

FIG. 2 illustrates a conventional AFP printing system 200 for printing a print document produced by an application program 204 on a client computer 202. The client computer 202 may be any computer, one of which is described above. The application program 204 running on the computer 202 generates a data stream that contains page description information. For example, the page description information might contain EPS objects and PDF objects contained within the print data stream.

The print document description is provided to a conversion program 206 which generates data stream 214 which is a formatted, platform, device and resolution independent, logical description of the print document. In the process of forming the data stream the conversion program stores certain information, such as fonts and formatting information, in a common database called a resource database 210. The conversion program then generates a logical description of the document with references to information stored in the resource database 210. In particular, such a logical description of a data stream utilized for printing in the AFP system is that aforementioned MO:DCA file format, which is discussed in more detail below. The print data in MO:DCA format containing references to the resources stored in database 210 is stored in spool 212. Resources may also be carried in a resource group that is part of the actual print file. Such resources are referred to as 'in line' resources in an AFP system.

The spool 212 both stores and spools the MO:DCA data stream 214 representing the print document from the conversion program 206. The spooled output data stream 216 is transmitted to a print server 218 that converts the device-independent print specifications to a device specific data stream by means of a printer driver 220, and the resource database 210. The resource database 210 is utilized to convert the MO:DCA data stream to a print data stream including details of a physical medium using a process called "outboard formatting." The resulting data stream 222 called an Intelligent Printer Data Stream™ (IPDS™, trademark of IBM Corporation, Armonk, N.Y.) is sent to the printer 224.

Printer 224 has a control unit 228 with which print server 218 can communicate and an internal memory 226. The communication between the print server 218 and the printer is bidirectional. For example, print server 218 may inquire of printer 224 whether a particular resource, such as a font, is resident in the printer memory 226. If the resource is not present, print server 218 can retrieve the font from resource database 210 and download it using data stream 222 into printer memory 226. The resource will then be available for future use. Subsequently, when print data that refers to the downloaded resource is received by the printer 224, the printer 224 will combine the resource with the data and provide the combination to a conventional EPS or PDF Rasterizing Image Processor (called a "RIP", not shown in FIG. 2) which converts the data into a printable graphic image.

A generalized representation of a page description data stream for a two page print document in the MO:DCA format is shown below. The document consists of structured fields that can contain data or control information. The structured fields are specified in accordance with the MO:DCA protocol as follows:

```
BDT
    BPG1
        BAG
            page 1 resource data reference
        EAG
        page 1 print data
    EPG1
```

```
                        -continued
    BPG2
        BAG
            page 2 resource data reference
        EAG
        page 2 print data
    EPG2
EDT
```

The document includes a Begin Document structured field (BDT) for marking the beginning of the print document, and an End Document structured field (EDT) for marking the end of the document. Similarly, the two pages each have a Begin Page structured field (BPG) for marking the beginning of each page, and an End Page structured field (EPG) for marking the end of each page.

Each page has a resource area defined between a Begin Active Environment Group structured field (BAG) and an End Active Environment Group structured field (EAG). This area contains references to fonts, bitmaps, etc. which are used to print the page print data that follows the active environment area. The page "data" in the data stream may be a reference to the page data, as indicated above, or the actual page data itself.

The print server 218 sends data to the printer 224 by means of an IPDS™ data stream 222. In this stream, non-native data, such as EPS and PDF data, is carried in containers. Each container has a control field and a data field. As will be explained, these containers are used to convey both formatting control data and printable data. The formatting control data allows the inventive system to identify redundant formatting information. The treatment of EPS and PDF objects will be discussed separately below.

Handling of EPS Print Objects in an AFP Data Stream

Figure 3:
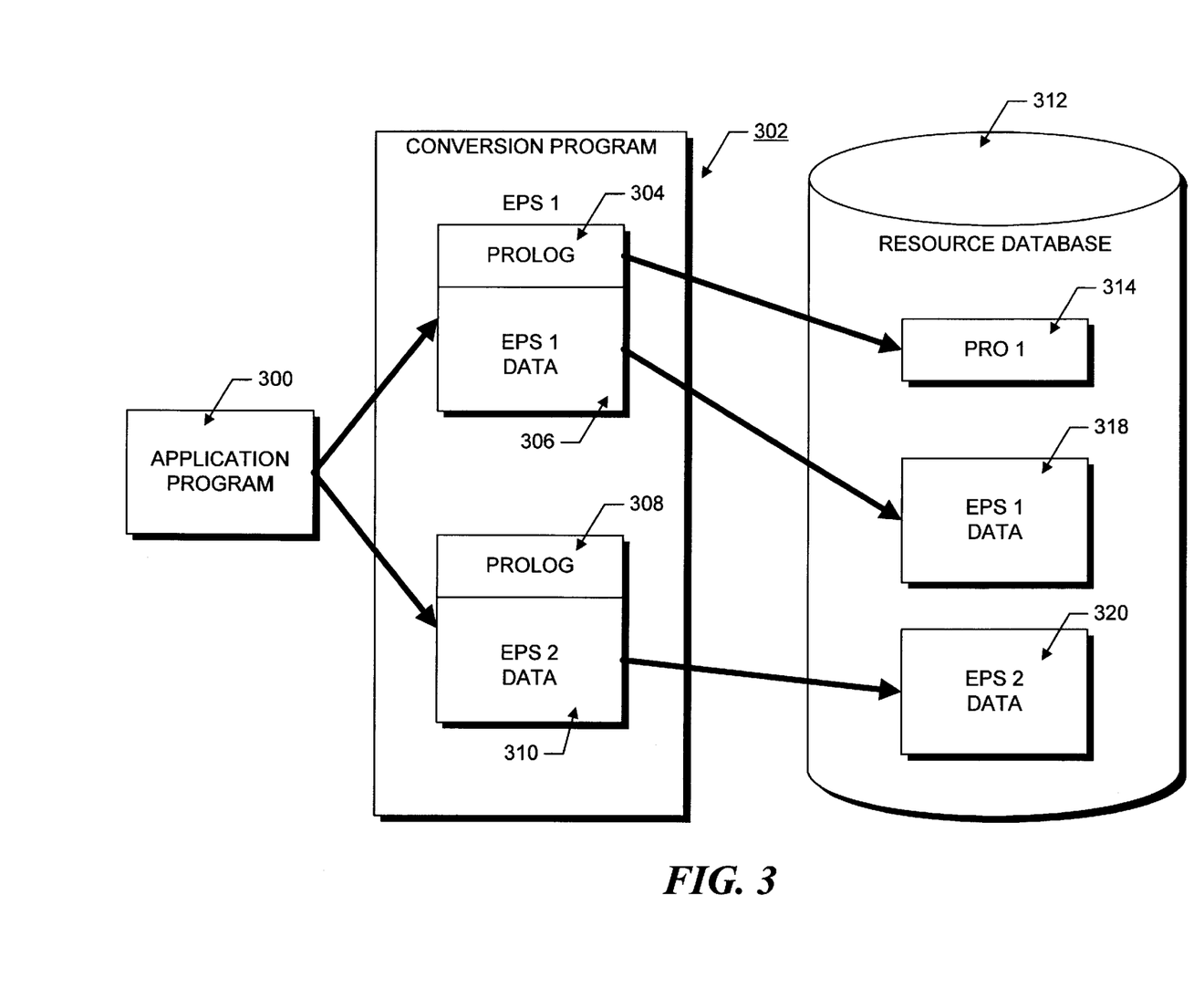
FIG. 3 is a flow chart generally showing the steps for installing EPS objects in a printing system in preparation for printing.

FIG. 3 illustrates the processing of EPS print objects in an AFP printing system. In this system, an application program 300 generates print data. The application may embed graphic images generated with a graphic program, such as Corel Draw®. With such a program, a user can create a graphic image for display and can choose an EPS object as an output format. For example, the EPS object might describe some picture like a company logo which appears on every page of the printed document. As previously mentioned, each EPS object, for example EPS 1 object in FIG. 3 comprises a prolog 304 that contains header information for the actual EPS data 306 that is comprised of Postscript graphic commands. The prolog can also contain some resources and may be thousands of kilobytes long. In a conventional system this EPS object would be stored in the resource library so that it could later be retrieved, along with its prolog, and sent to the printer.

The same graphics program will create the same prolog for each EPS object it generates. Therefore, if the same graphics program is used through out the document, the same prolog will be created even though the EPS data may be different for each object. For example, if EPS object EPS 2 in FIG. 3 has been created with the same graphics program, prolog 308 will be identical to prolog 304 even though data 310 may be different from data 306. Therefore, with conventional print systems the redundant prologs are all sent to the printer.

In accordance with the principles of the invention, the conversion program 302 which encodes the print data into the conventional AFP data stream is modified. When storing EPS objects, such as EPS 1 and EPS 2, in the resource database 312, all of the EPS objects that have the same prolog are separated so that the prolog is removed from the object and only the actual object body containing the print data is stored. The prolog information is stored only once. For example, when the conversion program 302 encounters EPS object 1 it removes the prolog 304 and stores it separately as resource 314 in resource database 312 under a name, such as "PRO 1", which name is generated in a conventional fashion using the AFP naming convention for resources. The EPS object body containing the data 306 is also stored in the resource database 312 as resource 318. Note that those objects could also be stored directly in a resource group in the print file.

However, when the conversion program 302 encounters the next EPS object 2 in the print data stream, it separates the prolog 308. Since an identical prolog 304 from object EPS 1 is already stored in the resource database 312 as object 314, the conversion program simply discards the duplicate prolog information 308 and stores the body 310 for object EPS 2 in the resource library as object 320. The result is that there are many EPS object bodies stored in the resource database 312, but only one copy of the redundant prologs.

It is also necessary to connect the prolog information with the information prior to printing so that each EPS object can be reconstructed at the printer. This reconstruction is necessary because the printer uses a standard postscript rasterizing image processor (Postscript RIP) to convert the EPS prolog and data into a printable image. The conventional Postscript RIP expects to see an EPS object with the prolog information preceding the data. The stored EPS prologs and EPS data are reconstructed at the printer by modifying the MO:DCA and IPDS™ data streams to carry additional information.

In particular, when the conversion program 302 is generating the MO:DCA data stream, it adds two new structured fields to the MO:DCA data stream: a Map Data Resource (MDR) structured field and an Include Object (IOB) structured field. Using the previous two-page MO:DCA data stream example discussed above, the new fields are positioned for an EPS object on page 1 as follows:

```
BDT
    BPG1
        BAG
            page 1 resource data references
            MDR FQN 'DE' <PRO 1>
        EAG
        page 1 print data
            IOB    EPS 1 DATA
                    FQN 'DE' <PRO 1>
    EPG1
    BPG2
        BAG
            page 2 resource data references
        EAG
        page 2 print data
    EPG2
EDT
```

The above example includes only one object on page 1. It would be obvious to those skilled in the art that more than one object could be included on page 1 and one or more objects could be included on page 2. The MDR field in the active environment group includes a fully-qualified name triplet (FQN). Fully-qualified name triplets are defined in the MO:DCA architecture and are unique. In accordance with the principles of the invention a new triplet, called the "DE" triplet, is defined. The purpose of the "DE" triplet is to carry the AFP name which points to a stored EPS prolog 314. In the example above, the FQN 'DE' triplet is contained in the MDR structured field and carries the AFP name "PRO 1" which points to the EPS prolog 314 stored in the resource database 312.

The same "DE" fully qualified name triplet is also contained in the Include Object (IOB) structured field in the page 1 print data area. This FQN also contains the AFP name "PRO 1" which points to the EPS prolog 314 in the resource database 312. The IOB field also contains additional information which applies to the EPS object, such as a reference to the EPS body (EPS 1 DATA) stored in the resource database 312 and other information, including the position of the object on the page, size and rotation, etc. (not illustrated in the above example.)

Figure 4:
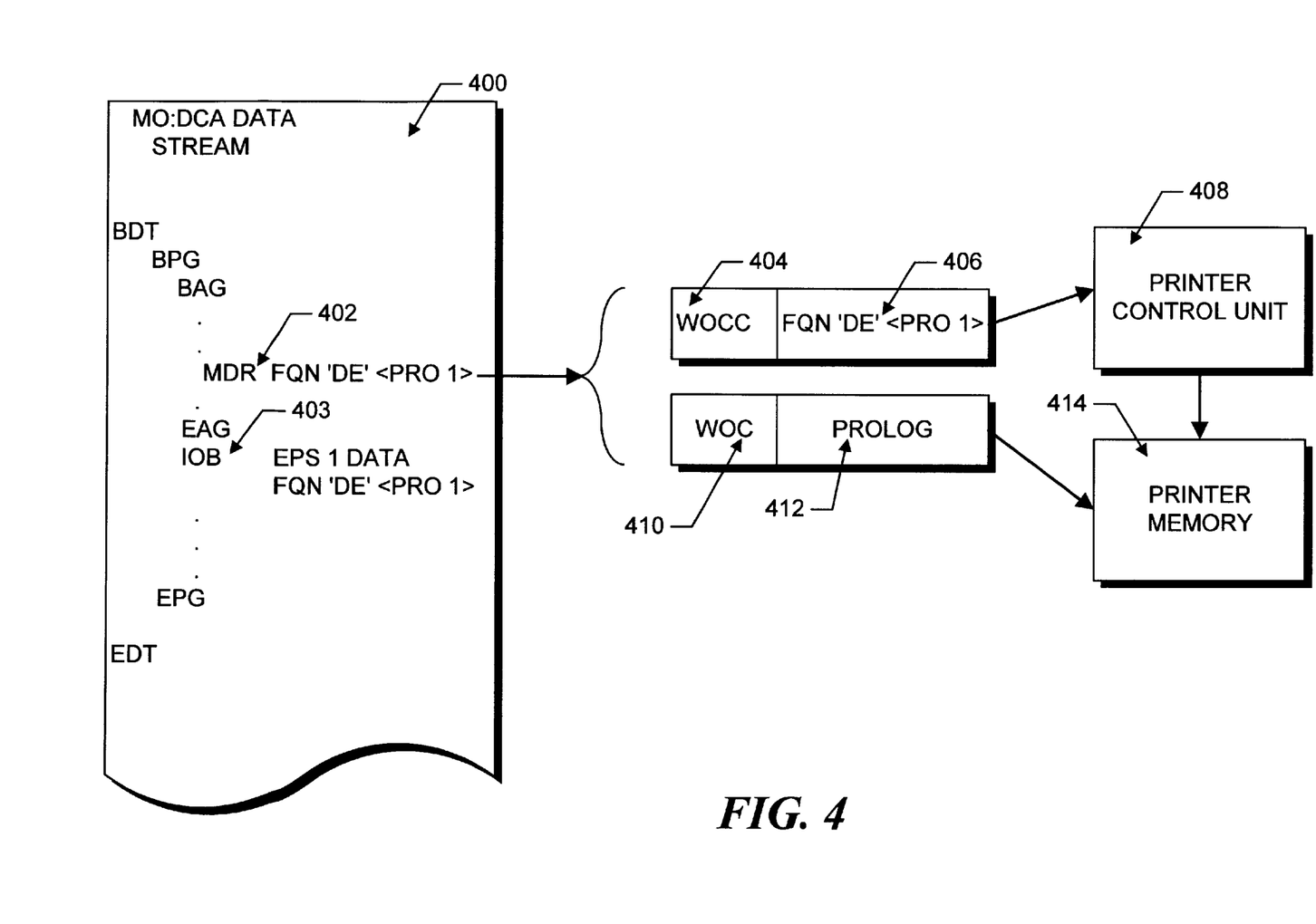
FIG. 4 is a flow chart generally showing the process for downloading an EPS prolog resource to a printer.

The MDR structured field in the MO:DCA data stream causes the print server 218 (FIG. 2) to download the EPS prolog, if it is not already downloaded, to the printer 224 during the processing of the MO:DCA data stream 400. This download operation is illustrated in FIG. 4 where the MO:DCA data stream 400 is processed in the print server 218 in a conventional fashion. When the print server 218 processes the page one data in the MO:DCA stream illustrated above, it reaches the active environment group and reads the MDR structured field 402. The MDR field 402 informs the print server 218 that a stored resource is required to print the rest of the page one data.

As previously mentioned, the print server 218 carries on a two-way communication with the printer 224. The print server 218 first queries the printer 224 to determine whether the printer 224 already has the EPS prolog 1 data. The printer 224 then responds to the print server 218 as to whether it already has the PRO 1 data stored in its memory 226. Assuming the printer 224 does not have the EPS prolog data, the print server 218 uses the AFP name "PRO 1" contained in the FQN "DE" and retrieves the prolog 1 data from the resource database 312. The print server 218 then downloads the prolog 1 data to the printer 224.

More particularly, the print server 218 sends information to the printer 224 using the aforementioned Write Object Container Control (WOCC) and Write Object Container data (WOC) commands. The Write Object Container Control 404 is used to send control information to the printer control unit 408. The Write Object Container 410 is used to send prolog data 412 to either the printer control unit 408 or the printer memory 414.

When the print server 218 processes the MDR structured field 402, it places the FQN 'DE' containing the AFP "PRO 1" name in the Write Object Container Control 404. The server then sends the FQN 'DE' and "PRO 1" name to the printer control unit 408 as shown schematically in FIG. 4.

The FQN 'DE' containing the "PRO 1" name prepares the printer control 408 to receive prolog data. The print server 218 retrieves the prolog data from the resource database 314 (FIG. 3) and inserts the data 412 into the Write Object Container 410. The prolog data 412 is then sent to the printer 224 where the printer control unit 408 causes the prolog data 412 to be stored in the printer memory 414 under the name reference "PRO 1".

Figure 5:
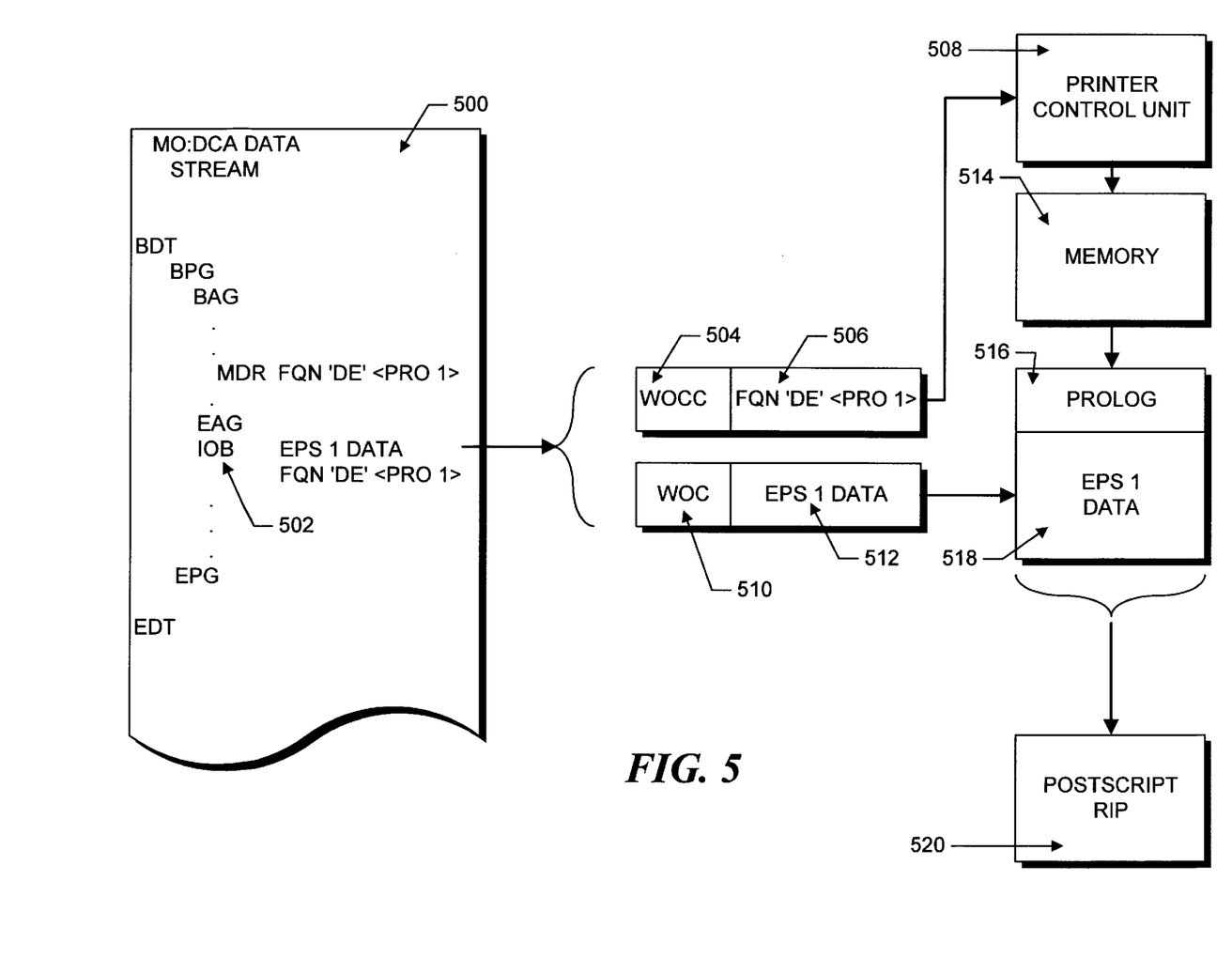
FIG. 5 is a flow chart generally showing the process for printing a page with an EPS object that references a prolog resource.

The print server 218 then continues processing the MO:DCA data stream 400 until the IOB structured field 403 is reached. The processing caused by the IOB structured field 403 is shown in FIG. 5. In FIG. 5, the IOB structured field 502 contained in the MO:DCA data stream 500 is received by the print server 218. The print server 218 extracts the FQN 'DE' and "PRO 1" name contained in the IOB field and inserts the FQN and name 506 into a Write Object Container Control 504. The FQN 'DE' and name "PRO 1" 506 is sent to the print control unit 508. In response the printer control 508 extracts the prolog data, using the name "PRO 1," as a reference from the printer memory 514.

In addition, in response to EPS data reference in the IOB structured field 502, the print server 218 extracts the EPS object body 318 from the resource database 312 and places the EPS print data 512 in a Write Object Container 510 which is sent to the printer 224. At the printer 224, the EPS data 512 in the Write Object Container 510 is combined with the prolog information 516 retrieved from the memory 514 and the reformed formed EPS object 518 is provided to a conventional Postscript® rasterizing image processor (RIP) 520. Since the EPS data is now preceded by the correct prolog, the Postscript RIP 520 interprets this information as it would any other EPS object and generates a rasterized dot formation to print the object. This rasterized object is then merged with other print data on the page.

Multiple EPS objects on a page would be handled by including an MDR structured field in the active environment group for each EPS object on the page and, similarly, including an IOB structured field in the page data. for each EPS object on the page. If all EPS objects used the same prolog, then each MDR and IOB structured field would include the FQN 'DE'<PRO 1> field, but the IOB structured field would include a reference to the object body for each object.

Handling of PDF Print Objects in an AFP Data Stream

Figure 6:
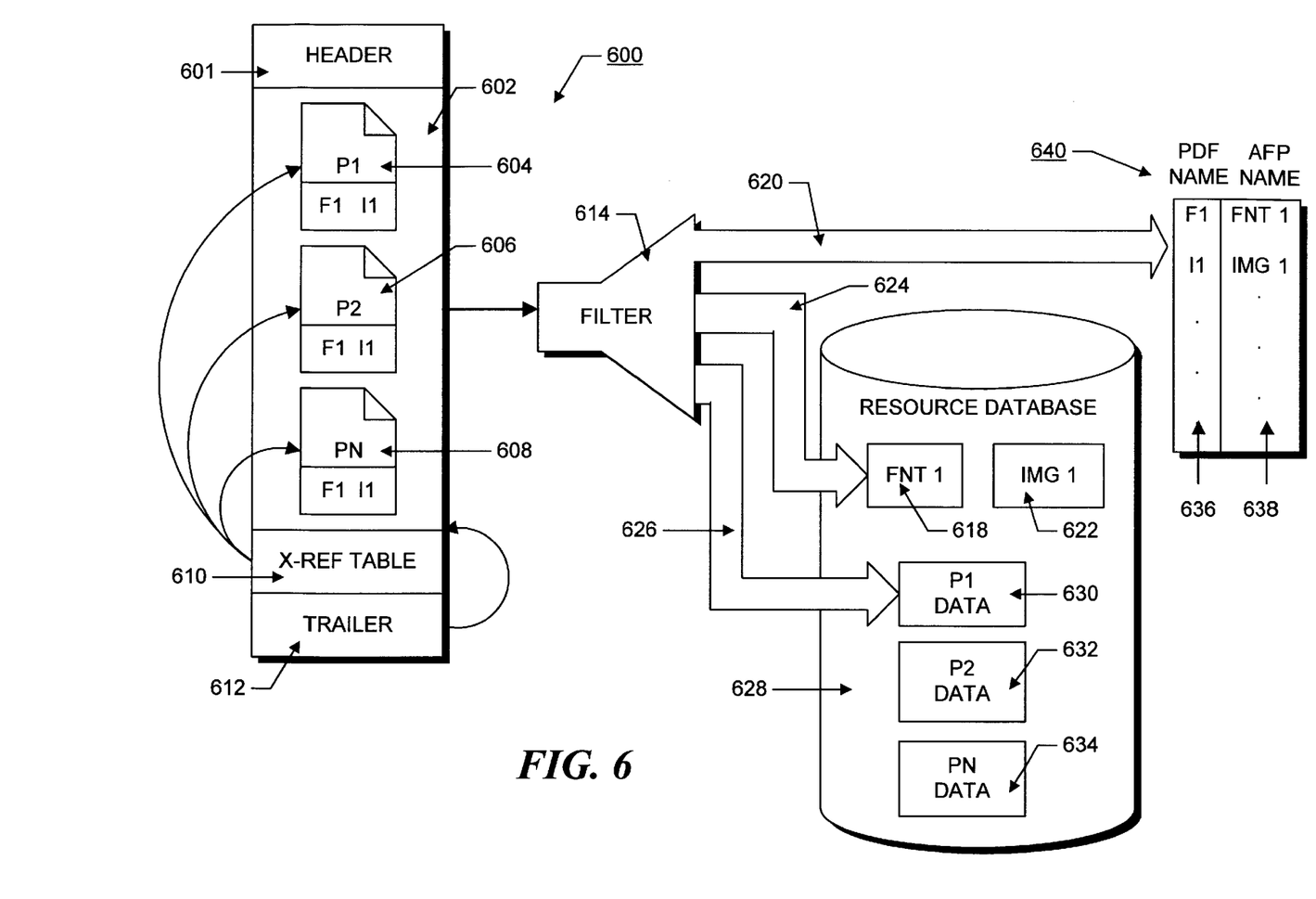
FIG. 6 is a flow chart generally showing the steps for installing PDF objects in a printing system in preparation for printing.

FIG. 6 illustrates the structure of a PDF print object 600. The object 600 consists of a header 601, a body 602, a cross reference table 610 and a trailer 612. The trailer 612 identifies the location of the cross reference table 610 and the cross reference table 610 contains indices which refer to page body print data for each of the separate pages located in the object body 602. The data for each page includes the actual page print data P1 and may also include resources such as a font F1 or an image I1. In the particular PDF print object 600 shown in FIG. 6, there are three pages, 604, 606 and 608. Each of these pages includes page data, P1, P2 and PN, but also each page requires the same font resource data F1 and the same image I1. Therefore, if these page objects were simply referenced, or contained, in the data stream, both the font resource F1 and the image resource I1 would be downloaded to the printer three times.

This situation is similar to that of the EPS print objects, however, in a PDF print object, the page print data may have internal references to the resources associated with each page. These references are generally made by referring to a resource name which is determined in accordance with a PDF naming protocol. It is, therefore, important to preserve this name so that when the PDF page data is later reformed, the resource will be provided the correct name so that the internal page references will be correct.

In order to preserve PDF resource names, a new FQN is defined, called FQN 'BE'. This FQN will be used as described below to carry a reference to the PDF name of a resource. In particular, during initial processing, each PDF print object is provided to a filter program 614. In accordance with the principles of the invention, the filter program 614 generates three outputs. First, it extracts the resources from each page and stores them in the resource database 628 as indicated schematically by arrow 624. As with the EPS page objects, duplicate resources are not stored in the resource database 628; only the first resource copy encountered is stored. Therefore, in processing the three pages 604, 606 and 608, only one copy of the font resource F1 and the image I1 is stored in database 628. The resources are stored in the resource database using a name generated in accordance with conventional AFP protocol. For example, pages 604–608 include a font illustratively designated as "F1" using a PDF name format. When this font is stored in the resource database 628 it will be stored as resource 618 with an AFP name which may illustratively be "FNT 1". In a similar manner, the image which is common to pages 604–608 has a PDF name "I1" whereas, when the image is extracted and stored in resource data base 628 as resource 622, it is given a different name, such as "IMG 1", which is in accordance with AFP protocol used to store resources. As the AFP name is not generally the same name as used by the PDF object, the correspondence between the PDF name and the AFP name must be maintained.

In order to maintain this correspondence, the filter program 614 generates a name table 640 which relates the PDF name to the AFP name for each resource as indicated by arrow 620. The table 640 contains two columns, 636 and 638, where the first column 636 contains PDF names and the second column 638 contains the corresponding AFP names. As shown, the table 640 maintains the correspondence between the font names "F1" and "FNT 1" and the image names "I1" and "IMG 1."

The filter program 614 also extracts the page body print data and places it in the database 628 as indicated schematically by arrow 626. Database 628 contains the page data from each of the data pages in the PDF file 600. For example, page P1 data, 630, is the page data from page 604. Page P2 data, 632, is the print data from page 606 and data 634 is the data from page 608. Note that the PDF resources and the PDF page body print data could also be stored directly in a resource group in the print file.

A conversion program (not shown) which is processing the remainder of the print data generates a MO:DCA data stream, and, as with the EPS objects described above, the conversion program adds MDR and IOB structured fields to the MO:DCA data stream to handle each PDF print object. However, these fields are modified to include the newly defined FQN 'BE', as described above. Using the previous, two-page MO:DCA data stream example discussed above, the new fields are specified for a PDF object on page 1 which refers to a font resource with the PDF name "F1" as follows:

```
BDT
    BPG1
        BAG
            page 1 resource data references
            MDR FQN 'DE' <FNT 1>
                FQN 'BE' <F1>
        EAG
        page 1 print data
            IOB    P1 DATA
                FQN 'DE' <FNT 1>
                FQN 'BE' <F1>
    EPG1
    BPG2
        BAG
            page 2 resource data references
        EAG
        page 2 print data
    EPG2
EDT
```

The MDR field in the active environment group for page 1 now includes an FQN 'DE' which contains the AFP name "FNT 1". However, it also includes the new FQN 'BE' which contains the PDF resource name "F1". Similarly, the IOB structured field in the page 1 print data area also contains the 'DE' and 'BE' FQNs. These FQNs are built using the table 640 generated by the filter program 614 to maintain the correspondence between the PDF and AFP resource names. The table 640 is used in a similar fashion to build other FQNs for the other resources.

Figure 7:
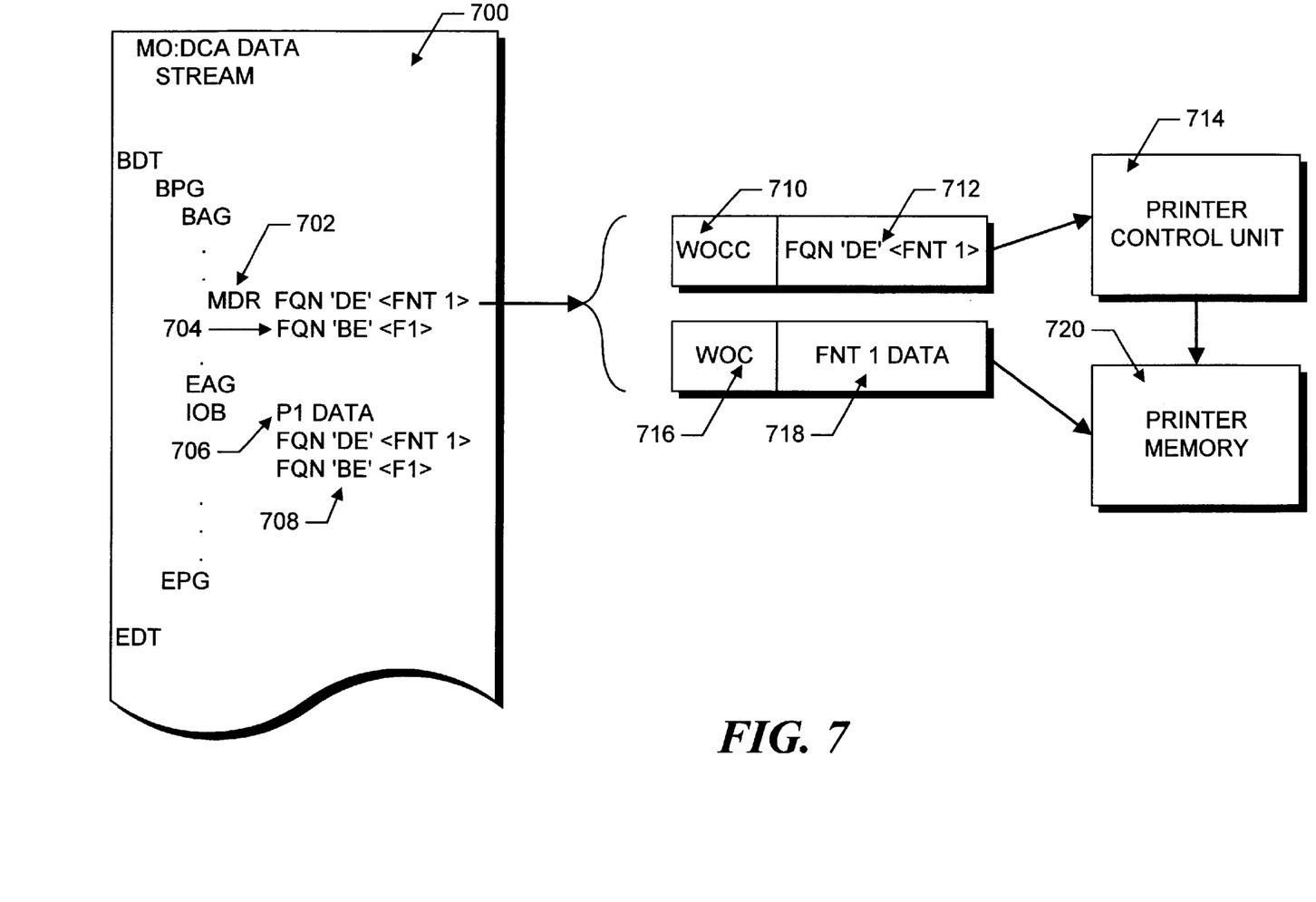
FIG. 7 is a flow chart generally showing the process for downloading PDF resources to a printer.

Processing of PDF data objects by the print server 218 (FIG. 2) is indicated schematically in FIG. 7. The print server 218 receives the MO:DCA data stream 700 and processes the stream in a conventional fashion until the MDR structure data field 702 is reached. During processing of field 702, the print server queries the printer to determine whether the resource identified by the FQN 'DE' as "FNT 1" is present in the printer memory. If it is not, the FQN 'DE' containing the AFP name "FNT 1", 712, is inserted into a Write Object Container Control 710 and sent to printer control unit 714. The FQN 'DE' prepares the print control unit 714 to receive the font 1 data. In addition, the print server receives the FQN 'BE' 704 which carries the PDF name for the font resource F1.

The AFP name "FNT 1" is used to retrieve the font data from the resource database 628. The font data 718 is placed in Write Object Container 716 and sent to the printer where the printer control unit 714 stores it in the printer memory 720 using the AFP name "FNT 1" as a reference.

Figure 8:
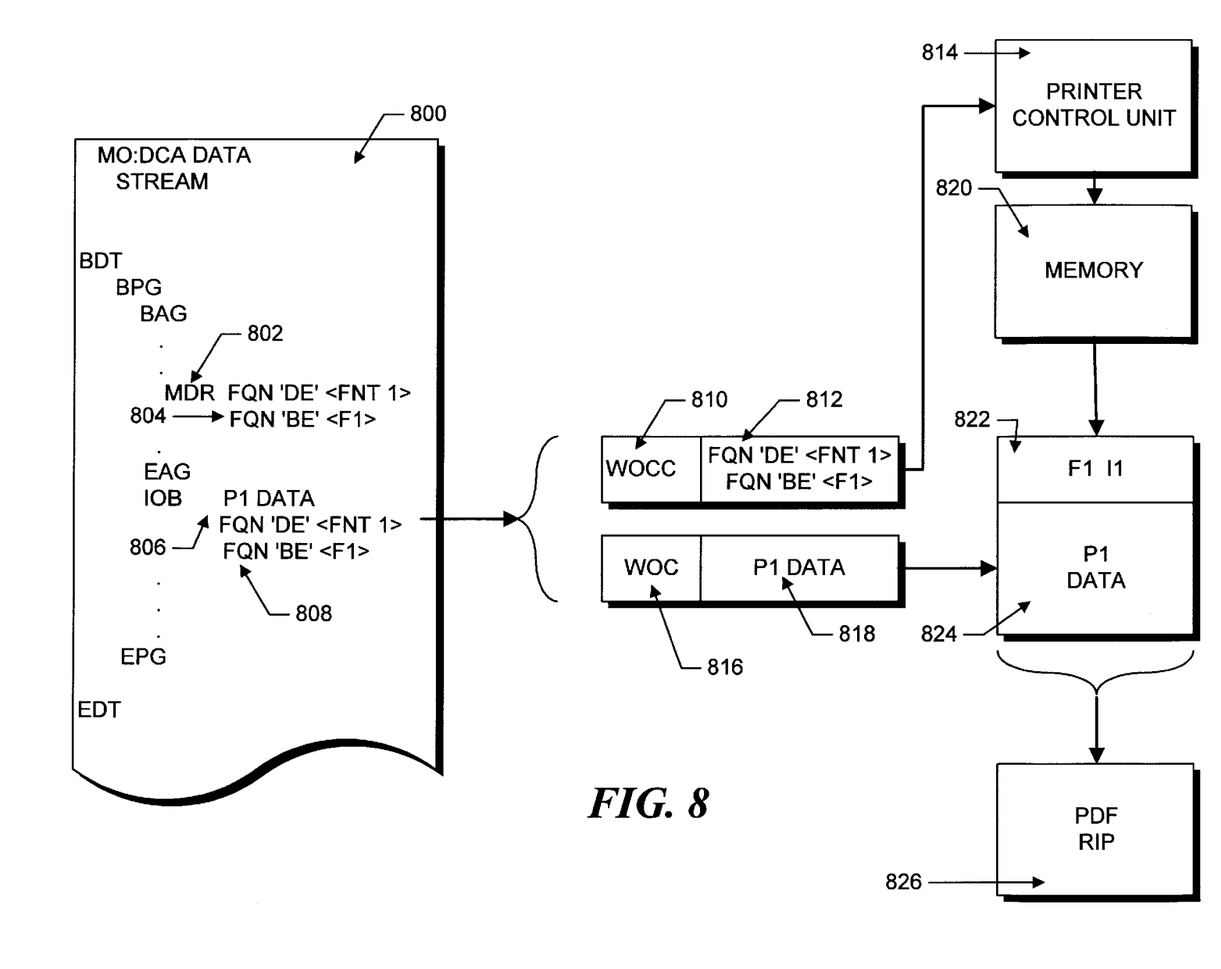
FIG. 8 is a flow chart generally showing the process for printing a page with a PDF object that references a resource.

Further processing of the MO:DCA data stream is illustrated in FIG. 8. In particular, FIG. 8 illustrates processing of the MO:DCA data stream 800 when the print server reaches the IOB structured field 806. The IOB structured field contains the FQN 'DE' and the FQN 'BE' containing the AFP resource name "FNT 1" and the PDF resource name "F1", respectively. When the print server reaches the IOB structured field, it places the FQN 'DE' (806) and the FQN 'BE' (808) as data 812 into a Write Object Container Control 810. The Write Object Container Control 810 is sent to the printer control unit 814 which controls the printer memory 820 to extract the font data using the AFP name "FNT 1". However, the printer control retains the correspondence between the "FNT 1" data and the PDF name "F1".

In addition, the print server, 218 uses the reference to the corresponding PDF page data to retrieve the data 818 from the resource database 628 and places the retrieved data into a Write Object Container 816 and sends Write Object Container 816 to the printer 224. At the printer 224, the page data is examined for references to resources. The printer uses the PDF name, such as "F1", which references a resource along with the correspondence of the PDF name to the AFP name to reference the font data previously retrieved from the printer memory 820. The font information retrieved from the memory 820, which includes the font "F1", is combined with the PDF page data 824 and sent to a conventional PDF RIP 826 which is used to print the PDF object. Since the. internal references in the page data are now correct, a conventional PDF RIP 826 can be used to process the PDF data for printing. The rasterized PDF data can then be merged with other print data on the page.

As with the EPS page objects, a separate MDR structured field and corresponding IOB field for each object on a page are placed in the active environment group and page data areas, respectively.

A software implementation of the above-described embodiment may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that the disclosed method and apparatus for printing non-native objects with a printing system that expects native objects can be extended to other page description languages, such as PDF or POSTSCRIPT®. Further, the methods of the invention may be achieved in either all software implementations, using the appropriate processor instructions, or in hybrid implementations which utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims.

What is claimed is:

1. Apparatus for printing print objects with an intelligent print system having a print server which processes a formatted data stream and a printer which communicates with the print server, the apparatus comprising:

a pre-processing program which responds to the resource data of the print objects by storing a single copy of resource data and discarding any duplicate copies;

a conversion program which inserts print data and a reference to the resource data into the formatted data stream at the point where the print object is to be printed;

a first mechanism in the print server which responds to the resource data reference in the formatted data stream by retrieving the resource data copy and sending the retrieved resource data copy to the printer; and a mechanism in the printer which responds to the resource data reference by combining the resource data and the print data and processing the combination for printing.

2. The apparatus of claim 1 wherein the print data in the formatted data stream comprises actual print content.

3. The apparatus of claim 1 wherein the print data in the formatted data stream comprises a reference to actual print content.

4. The apparatus of claim 3 further comprising a second mechanism in the print server which responds to the print data reference by sending the referenced print data and the resource data reference to the printer.

5. Apparatus according to claim 4 wherein the pre-processing program stores the print data of each of the print objects in a resource database.

6. Apparatus according to claim 5 wherein the second mechanism responds to the print data reference by retrieving the print data from the resource database and sending the retrieved print data to the printer.

7. Apparatus according to claim 1 wherein the pre-processing program stores the resource data of each of the print objects in a resource database.

8. Apparatus according to claim 1 wherein the pre-processing program stores the resource data of each of the print objects in the formatted data stream.

9. Apparatus according to claim 1 wherein the conversion program inserts into the formatted data stream a second reference to the resource data together with the print data at the point in the formatted data stream where the print object is to be printed.

10. Apparatus according to claim 9 further comprising a third mechanism in the print server which responds to the print data reference by sending the referenced print data and the resource data reference to the printer and wherein the third mechanism sends the second resource data reference and the print data to the printer.

11. Apparatus according to claim 1 wherein the print data references the resource data with a non-native name.

12. Apparatus according to claim 11 wherein the resource data is stored in a resource database with a native name which is different from the non-native name.

13. Apparatus according to claim 12 wherein the conversion program inserts into the formatted data stream a resource data reference including the non-native name and the native name.

14. Apparatus according to claim 13 wherein the first mechanism in the print server sends the retrieved resource data copy including the non-native name and the native name to the printer.

15. Apparatus according to claim 14 wherein the mechanism in the printer includes means for responding to a non-native name reference in the print data by using the non-native name in the resource data to obtain the native name, then using the native name to obtain the resource data and processing the combination of the resource data and the print data for printing.

16. Apparatus according to claim 1 wherein the print object is an EPS print object.

17. Apparatus according to claim 1 wherein the print object is a PDF print object.

18. Apparatus according to claim 1 wherein the pre-processing program comprises means for separating the print data into at least one page data object and means for storing the page data object in a resource database.

19. Apparatus according to claim 1 wherein the first mechanism in the print server includes a query mechanism which operates before sending the resource data copy to the printer to determine whether the printer already has a copy of the retrieved resource data and means for preventing a resource data copy from being sent to the printer when the printer already has a copy of the resource data.

20. Apparatus according to claim 19 wherein the printer has a memory and the resource data copy is stored in the memory.

21. A method for printing print objects with an intelligent print system having a print server which processes a formatted data stream and a printer which communicates with the print server, the method comprising the steps of:
(a) examining the resource data of each of the print objects and storing a single copy of resource data and discarding any duplicate copies;
(b) inserting into the formatted data stream print data and a reference to the resource data at the point in the formatted data stream where the print object is to be printed;
(c) using the resource data reference in the formatted data stream to retrieve the resource data copy;
(d) sending the retrieved resource data copy to the printer;
(e) using the print data reference to send the referenced print data and the resource data reference to the printer;
(f) combining the resource data and the print data in the printer in response to the resource data reference; and
(g) processing the combination for printing.

22. A method according to claim 21 wherein the print data in the formatted data stream comprises actual print content.

23. A method according to claim 21 wherein the print data in the formatted data stream comprises a reference to actual print content.

24. A method according to claim 21 wherein step (a) comprises the step of:
(a1) storing print data of each of the print objects in a resource database.

25. A method according to claim 24 wherein step (e) comprises the steps of:
(e1) retrieving print data from the resource database; and
(e2) sending the retrieved print data to the printer.

26. A method according to claim 21 wherein step (a) comprises the step of:
(a2) storing the resource data of each of the print objects in a resource database.

27. A method according to claim 21 wherein step (a) comprises the step of:
(a3) storing the resource data of each of the print objects in the formatted data stream.

28. A method according to claim 21 wherein step (b) comprises the step of:
(b1) inserting into the formatted data stream a second reference to the resource data together with the reference to the print data at the point in the formatted data stream where the print object is to be printed.

29. A method according to claim 23 wherein step (e) comprises the steps of:
(e3) sending the second resource data reference and the print data to the printer.

30. A method according to claim 21 wherein the print data references the resource data with a non-native name and wherein step (a) comprises the step of:
(a2) storing the resource data in a resource database with a native name which is different from the non-native name.

31. A method according to claim 30 wherein step (b) comprises the step of:
(b2) inserting into the formatted data stream a resource data reference including the non-native name and the native name.

32. A method according to claim 31 wherein step (d) comprises the step of:
(d1) sending the retrieved resource data copy including the non-native name and the native name to the printer.

33. A method according to claim 32 wherein step (f) comprises the steps of:
(f1) examining the print data for a non-native name reference;
(f2) using the non-native name in the resource data to obtain the native name; and
(f3) using the native name to obtain the resource data information.

34. A method according to claim 21 wherein the print object is an EPS print object.

35. A method according to claim 21 wherein the print object is a PDF print object.

36. A method according to claim 35 wherein step (a) comprises the steps of:
- (a3) separating the print data into at least one page data object; and
- (a4) storing the page data object in a resource database.

37. A method according to claim 21 wherein step (d) comprises the steps of:
- (d2) before sending the resource data copy to the printer, determining whether the printer already has a copy of the retrieved resource data; and
- (d3) preventing a resource data copy from being sent to the printer when the printer already has a copy of the resource data.

38. A method according to claim 37 wherein the printer has a memory and step (d) comprises the step of:
- (d4) storing the resource data copy in the memory.

39. A computer program product for printing print objects with an intelligent print system having a print server which processes a formatted data stream and a printer which communicates with the print server, the computer program product comprising a computer usable medium having computer readable program code thereon, including:
- program code for examining the resource data of each of the print objects and storing a single copy of resource data and discarding any duplicate copies; program code for inserting into the formatted data stream print data and a reference to the resource data at the point in the formatted data stream where the page object is to be printed;
- program code for using the resource data reference in the formatted data. stream to retrieve the resource data copy;
- program code for sending the retrieved resource data copy to the printer;
- program code which uses the print data reference to send the referenced print data and the resource data reference to the printer;
- program code for combining the resource data and the print data in the printer in response to the resource data reference; and
- program code for processing the combination for printing.

40. A computer program product according to claim 39 wherein the print data in the formatted data stream comprises actual print content.

41. A computer program product according to claim 39 wherein the print data in the formatted data stream comprises a reference to actual print content.

42. A computer program product according to claim 39 wherein the examining program code comprises program code for storing the print data of each of the print objects in a resource database.

43. A computer program product according to claim 42 wherein the program code which uses the print data reference to send the referenced print data and the resource data reference to the printer comprises program code for retrieving the print data from the resource database in response to the print data reference; and program code for sending the retrieved print data to the printer.

44. A computer program product according to claim 39 wherein the examining program code comprises program code for storing the resource data of each of the print objects in a resource database.

45. A computer program product according to claim 39 wherein the examining program code comprises program code for storing the resource data of each of the print objects in the formatted data stream.

46. A computer program product according to claim 39 wherein the program code for inserting references into the formatted data stream comprises program code for inserting into the formatted data stream a second reference to the resource data together with the reference to the print data at the point in the formatted data stream where the print object is to be printed.

47. A computer program product according to claim 46 wherein the program code for sending the resource data reference and print data to the printer comprises program code for sending the second resource data reference and the print data to the printer.

48. A computer program product according to claim 39 wherein the print data references the resource data with a non-native name and wherein the examining program code comprises program code for storing the resource data in a resource database with an native name which is different from the non-native name.

49. A computer program product according to claim 48 wherein the program code for inserting references into the formatted data stream comprises program code for inserting into the formatted data stream a resource data reference including the non-native name and the native name.

50. A computer program product according to claim 49 wherein the program code for sending the resource data copy to the printer comprises program code for sending the retrieved resource data copy including the non-native name and the native name to the printer.

51. A computer program product according to claim 49 wherein the program code for combining the resource data and the print data in the printer comprises:
- program code for examining the print data for a non-native name reference;
- program code for using the non-native name in the resource data to obtain the native name; and
- program code for using the native name to obtain the resource data information.

52. A computer program product according to claim 39 wherein the print object is an EPS print object.

53. A computer program product according to claim 39 wherein the print object is a PDF print object.

54. A computer program product according to claim 53 wherein the examining program code comprises:
- program code for separating the print data into at least one page data object; and
- program code for storing the page data object in a resource database.

55. A computer program product according to claim 39 wherein the program code for sending the resource data copy to the printer comprises:
- program code, operable before sending the resource data copy to the printer, for determining whether the printer already has a copy of the retrieved resource data; and
- program code for preventing a resource data copy from being sent to the printer when the printer already has a copy of the resource data.

56. A computer program product according to claim 55 wherein the printer has a memory and the program code for sending the resource data copy to the printer comprises program code for storing the resource data copy in the memory.

* * * * *